(12) United States Patent
Suharno

(10) Patent No.: US 6,843,070 B1
(45) Date of Patent: Jan. 18, 2005

(54) REFRIGERANT RECYCLING SYSTEM WITH SINGLE BALL VALVE

(75) Inventor: Anwar Suharno, Schaumburg, IL (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 10/189,608

(22) Filed: Jul. 8, 2002

Related U.S. Application Data

(60) Provisional application No. 60/360,464, filed on Feb. 28, 2002.

(51) Int. Cl.[7] .............................................. F25B 45/00
(52) U.S. Cl. ............................ 62/292; 62/149; 62/150; 62/77; 62/85; 62/231; 137/625.47; 137/625.46
(58) Field of Search .......................... 62/149, 150, 292, 62/77, 85, 231; 137/625.47, 625.46, 625.22

(56) References Cited

U.S. PATENT DOCUMENTS

| | | | | |
|---|---|---|---|---|
| 2,238,958 A | * | 4/1941 | Wells ........................... | 73/151 |
| 3,012,752 A | | 12/1961 | Buck | |
| 3,118,463 A | * | 1/1964 | Lacart ......................... | 137/343 |
| 3,203,448 A | | 8/1965 | Jansen | |
| 3,276,472 A | | 10/1966 | Jinkens et al. | |
| 3,438,260 A | * | 4/1969 | Kowal et al. .................. | 73/420 |
| 3,485,265 A | | 12/1969 | Buono | |
| 3,686,954 A | | 8/1972 | Motl | |
| 3,721,265 A | | 3/1973 | Hoffland | |
| 4,109,536 A | | 8/1978 | Strybel | |
| 4,544,333 A | * | 10/1985 | Hirano ......................... | 417/299 |
| 4,572,239 A | | 2/1986 | Koch et al. | |
| 4,593,717 A | | 6/1986 | Levasseur | |
| 4,881,961 A | | 11/1989 | Mock | |
| 4,926,675 A | * | 5/1990 | Schohl et al. .................. | 73/19 |
| 4,982,760 A | | 1/1991 | Mustaklem | |
| 5,167,126 A | | 12/1992 | Cartwright | |
| 5,443,453 A | | 8/1995 | Walker et al. | |
| 5,477,884 A | | 12/1995 | Barkes | |
| 5,479,788 A | * | 1/1996 | Roegner ....................... | 62/292 |
| 5,558,124 A | | 9/1996 | Randall | |
| 5,730,420 A | | 3/1998 | Tow | |
| 5,875,638 A | * | 3/1999 | Tinsler ......................... | 62/149 |
| 5,944,055 A | | 8/1999 | Dicky | |
| 5,988,220 A | | 11/1999 | Sakaki | |
| 6,036,446 A | * | 3/2000 | Goodman ..................... | 417/54 |
| 6,135,152 A | | 10/2000 | Knapp | |
| 6,334,320 B1 | | 1/2002 | Brown et al. | |
| 6,338,255 B1 | | 1/2002 | Richard et al. | |

FOREIGN PATENT DOCUMENTS

| | | |
|---|---|---|
| EP | 0476546 A1 | 3/1992 |
| EP | 1114742 A2 | 7/2001 |
| GB | 2177486 A | 1/1987 |

\* cited by examiner

*Primary Examiner*—William C. Doerrler
*Assistant Examiner*—Mark S. Shulman
(74) *Attorney, Agent, or Firm*—Seyfarth Shaw LLP

(57) ABSTRACT

A refrigerant handling system includes coupling apparatus for coupling a refrigerant processing apparatus to an automotive air-conditioning system. The coupling apparatus includes a ball valve including a common port and at least two selectable ports, and a valve member manually movable among a closed condition, wherein the common port is connected to neither selectable port, and three open conditions wherein the common port is connected, respectively, to each of the selectable ports and both of the selectable ports. The common port of the valve is connected to the refrigerant processing apparatus, while the selectable ports are connected, respectively, to conduits for providing connections to the high-pressure and low-pressure sides of the air-conditioning system.

19 Claims, 2 Drawing Sheets

REFRIGERANT RECYCLING SYSTEM WITH SINGLE BALL VALVE

RELATED APPLICATION

This application claims the benefit of the filing date of U.S. Provisional Application No. 60/360,464, filed Feb. 28, 2002.

BACKGROUND

This application relates to refrigerant handling systems and, in particular, to systems of the type which may be used for recovery and recycling of refrigerant from, and recharging of refrigerant to, automotive air-conditioning systems. The application relates in particular to techniques for coupling a refrigerant handling system to an automotive vehicle air-conditioning system.

An automotive air-conditioning system has two access ports, viz, a HIGH pressure side port and a LOW pressure side port. In servicing such air-conditioning systems, refrigerant can be removed from or added to the system through either or both of these ports. Air conditioning service equipment, such as a refrigerant handling system, is coupled to these ports through suitable hoses, respectively connected through valves, one valve for each port. Thus, in operation of the air-conditioning service equipment, the operator must operate both of these valves.

SUMMARY

This application describes a simplified technique for coupling a refrigerant handling system to an associated refrigeration system.

An aspect of the coupling arrangement is the use of a single valve for coupling a refrigerant handling system to either or both of the HIGH and LOW sides of an automotive air-conditioning system.

Another aspect is the provision of a refrigerant handling system incorporating a coupling arrangement of the type set forth.

A still further aspect is the provision of a method of coupling a refrigerant handling system to an associated refrigeration system.

Certain ones of these and other aspects may be attained by providing a refrigerant handling system comprising: refrigerant processing apparatus having a refrigerant inlet/outlet conduit, and a multi-position valve having a body with a common port communicating with the inlet/outlet conduit and at least first and second selectable ports, the valve including a valve member defining a channel and carried by the body for communication with the common port and for selective movement among plural conditions, the valve member having a closed condition in which the channel provides communication between the common port and neither of the selectable ports, the valve member having three open conditions in which the channel provides communication between the common port and, respectively, each of the selectable ports and both of the selectable ports.

BRIEF DESCRIPTION OF THE DRAWING

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Figure 1:
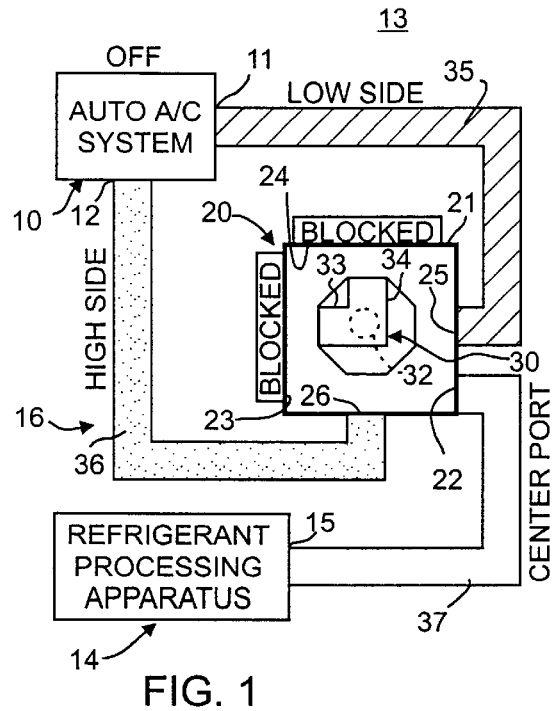
FIG. 1 is a diagrammatic illustration of an embodiment of a single valve coupling a refrigerant handling system to HIGH and LOW sides of an automotive air-conditioning system, with the valve disposed in an OFF condition.

Referring to FIGS. 1–4, there is a diagrammatically illustrated a refrigeration or air-conditioning system, generally designated by the numeral 10 for an automotive vehicle, which could be any type of automotive vehicle, and is of known construction. The system 10 has LOW pressure side and HIGH pressure side ports 11 and 12. There is also diagrammatically illustrated a refrigerant handling system 13, which includes refrigerant processing apparatus 14 which may include air-conditioning service equipment of the type which may recover and recycle refrigerant from an air-conditioning system and/or recharge refrigerant to the air-conditioning system. The refrigerant handling system 13 has a refrigerant inlet/outlet port 15. The refrigerant handling system 13 is provided with coupling apparatus 16 for providing communication between the ports 11 and 12 of the air-conditioning system 10 and the inlet/outlet port 15 of the refrigerant processing apparatus 14. The refrigerant processing apparatus 14 may be of any of a number of well-known different types of such apparatus and, accordingly, the details thereof are not disclosed herein, since they are not pertinent to the coupling apparatus 16. However, it will be appreciated that, typically, the inlet/outlet port 15 will be connected, internally of the refrigerant processing apparatus 14, through suitable processing elements, to a recycled refrigerant vessel and/or a virgin refrigerant vessel (not shown), all in a known manner.

Referring also to FIGS. 5–8, the coupling apparatus 16 includes a ball valve 20, which has a housing 21 and is provided with five ports, including a common center port 22 and selectable side ports 23, 24, 25 and 26. The center port 22 is, for ease of illustration, shown in FIGS. 1–4 as disposed on the side of the housing 21, but is actually disposed centrally of the bottom of the housing 21, as can be seen in FIGS. 5–8. The ports 23 and 24 are permanently blocked. The valve 20 also includes a valve member 30, which is moveable among four positions, respectively illustrated in FIGS. 1–4, by means of a pointer-handle 31 (see FIGS. 5–8). The valve member 30 has a channel therethrough which includes an axial portion 32, which is always in communication with the center port 22, and two lateral arm portions 33 and 34 substantially at 90° to each other and which, respectively, communicate with a selected two of the side ports 23–26, depending upon the position of the valve member 30.

The coupling apparatus 16 includes conduits 35, 36 and 37, which may be in the nature of suitable hoses. The conduits 35 and 36 have first ends thereof respectively connected to the side ports 25 and 26 of the valve 20, the other ends thereof being respectively connectable to the ports 11 and 12 of the air-conditioning system 10. The conduit 37 has one end thereof connected to the center port 22 of the valve 20, and the other end thereof connected to the inlet/outlet port 15 of the refrigerant processing apparatus 14.

Referring to FIGS. 1 and 5–8, there is illustrated an OFF condition of the valve 20, wherein the lateral arm portions 33 and 34 of the channel of the valve member 30 respectively communicate with the blocked side ports 23, and 24. Thus, in this condition both of the conduits 35 and 36 are disconnected from the conduit 37, so that there can be no flow of refrigerant between the automotive air conditioning system 10 and the refrigerant processing apparatus 14.

Figure 2:
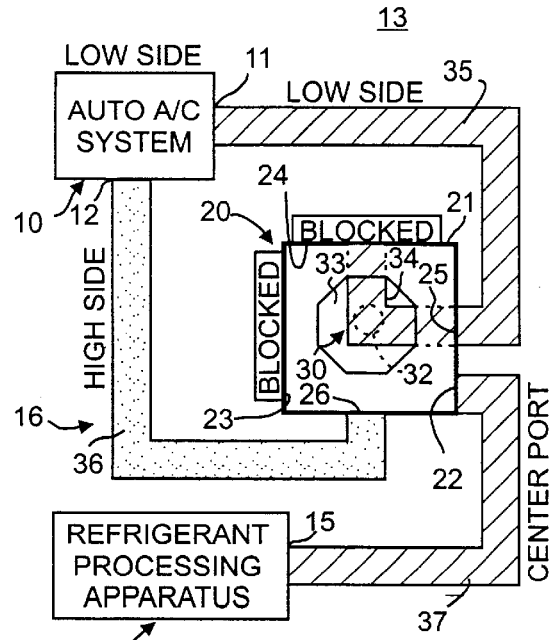
FIG. 2 is a diagrammatic illustration similar to FIG. 1, illustrating the valve in a first open condition coupling the refrigerant handling system to only the LOW side of the automotive air-conditioning system.

In FIG. 2, the valve member 30 has been rotated 90° clockwise to a first open condition, wherein the arm 33 of the valve member 30 is connected to the blocked side port 24, but the other arm 34 communicates with the side port 25 and, thus, with the conduit 35. Accordingly, refrigerant flow is permitted between the conduit 35 and the conduit 37. However, there is no flow through the HIGH side conduit 36. Thus, flow is permitted between the refrigerant processing apparatus 14 and only the low side of the container conditioning system 10.

Figure 3:
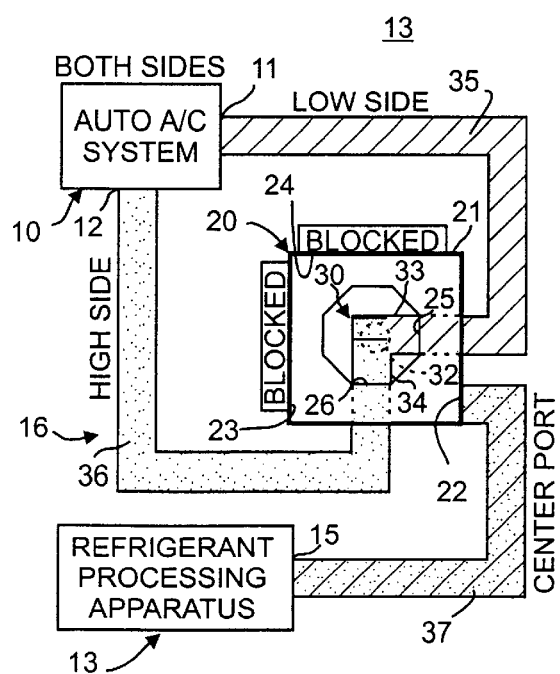
FIG. 3 is an illustration similar to FIG. 1, illustrating the valve in a second open condition coupling the refrigerant handling system to both the HIGH and LOW sides of the automotive air-conditioning system.

In FIG. 3, the valve member 30 has been rotated 180° clockwise from the OFF condition of FIG. 1, so that now the arms 33 and 34 of the valve member 30 respectively communicate with the ports 25 and 26 and, therefore, with both of the conduits 35 and 36. Thus, the conduit 37 communicates with both of the conduits 35 and 36, so the refrigerant can flow between the refrigerant processing apparatus 14 and both of the HIGH side and the LOW side of the vehicle air-conditioning system 10.

Figure 4:
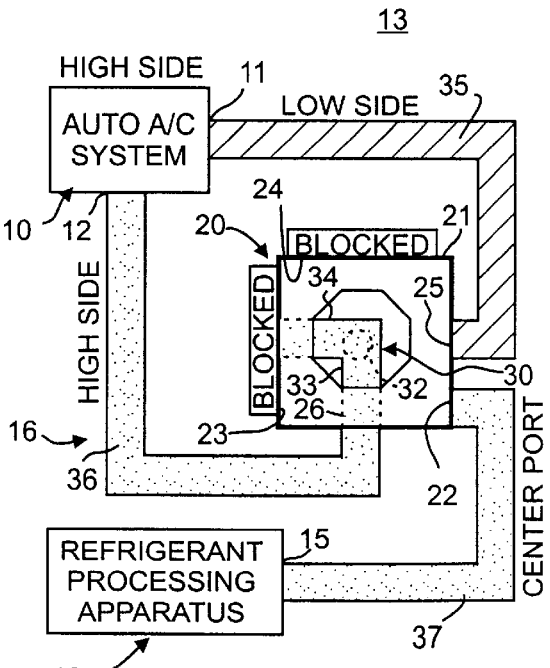
FIG. 4 is an illustration similar to FIG. 1, illustrating the valve in a third open condition coupling the refrigerant handling system to only the HIGH side of the automotive air-conditioning system.
Figure 5:
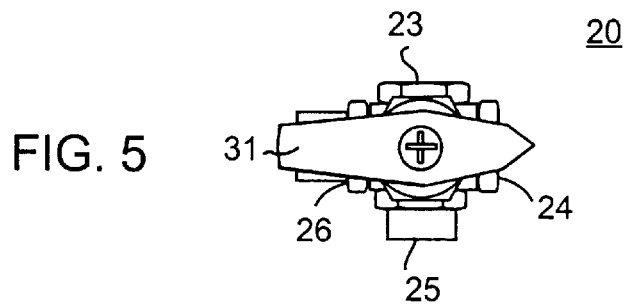
FIG. 5 is a top plan view of the valve diagrammatically illustrated in FIG. 1.
Figure 6:
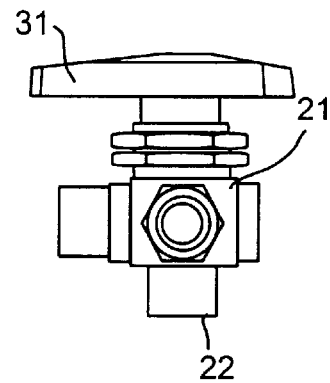
FIG. 6 is a front elevational view of the valve of FIG. 5.
Figure 7:
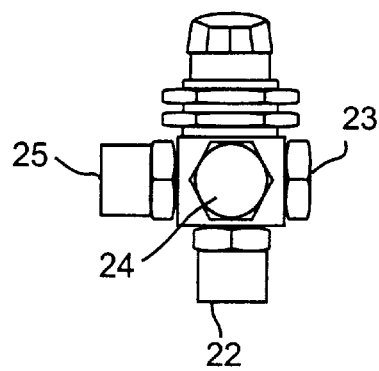
FIG. 7 is a side elevational view of the valve of FIG. 6, as viewed from the right-hand side thereof.
Figure 8:
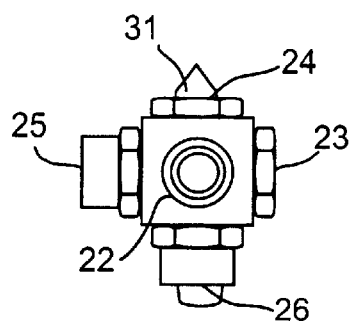
FIG. 8 is a bottom plan view of the valve of FIG. 7.

In FIG. 4, the valve member 30 has been rotated 270° from the OFF condition of FIG. 1, so that the arms 33 and 34 of the valve member 30 respectively communicate with the side port 26 and the blocked side port 23, providing communication between the conduits 36 and 37, but preventing flow through the conduit 35. Thus, refrigerant flow is permitted between the refrigerant processing apparatus 14 and only the HIGH side of the air conditioning system 10.

It will be appreciated that, during refrigerant recovery and recycling operations, refrigerant flow is from the vehicle air-conditioning system 10 to the refrigerant processing apparatus 14, whereas during recharging operations, recycled and/or virgin refrigerant flows from the refrigerant processing apparatus 14 to the vehicle air-conditioning system 10, all in a known manner.

While a particular embodiment has been shown and described, it will be apparent to those skilled in the art that changes and modifications maybe made without departing from the principles of the coupling arrangement in its broader aspects. The matter set forth in the foregoing description and accompanying drawings is offered by way of illustration only and not as a limitation.

What is claimed is:

1. A refrigerant handling system comprising:
   refrigerant processing apparatus having a refrigerant inlet/outlet conduit, and
   a multi-position valve having a body with a common port communicating with the inlet/outlet conduit and at least first and second selectable ports,
   the valve including a valve member defining a channel and carried by the body for communication with the common port and for selective movement among plural conditions,
   the valve member having a closed condition in which the channel provides communication between the common port and neither of the selectable ports,
   the valve member having three open conditions in which the channel provides communication between the common port and, respectively, each of the selectable ports and both of the selectable ports.

2. The system of claim 1, wherein the valve is a ball valve.

3. The system of claim 1, and further comprising a selector member for manually selecting the condition of the valve member.

4. The system of claim 1, wherein the valve includes four selectable ports, two of which are blocked so as to be unuseable.

5. The system of claim 4, wherein the valve member defines a channel including arm portions disposed at substantially a 90° angle to each other for respectively communicating with two adjacent ones of the selectable ports in each condition of the valve member.

6. The system of claim 1, and further comprising two refrigeration system conduits having first ends thereof respectively connected to the first and second selectable ports and having other ends thereof respectively connectable to ports of an associated refrigeration system.

7. The system of claim 1, wherein the valve member is moveable about an axis, the common port being disposed along the axis and the selectable ports being spaced-apart about the axis.

8. A coupling apparatus for coupling a refrigeration system to a refrigerant processing apparatus, the coupling apparatus comprising:
   a multi-position valve having a body with a common port and at least first and second selectable ports,
   the valve including a valve member defining a channel and carried by the body for movement among a closed condition in which the channel provides communication between the common port and neither of the selectable ports and three open conditions in which the channel provides communication between the common port and, respectively, each of the selectable ports and both of the selectable ports,
   a first conduit having an end thereof connected to the common port and another end thereof connectable to the associated refrigerant processing apparatus, and
   second and third conduits having first ends thereof respectively connected to the selectable ports and having second ends thereof connectable to the refrigeration system.

9. The apparatus of claim 8, wherein the valve is a ball valve.

10. The apparatus of claim 8, and further comprising a selector member for manually selecting the condition of the valve member.

11. The apparatus of claim 8, wherein the valve includes four selectable ports, two of which are blocked so as to be unuseable.

12. The apparatus of claim 11, wherein the valve member defines a channel including arm portions disposed at substantially a 90° angle to each other for respectively communicating with two adjacent ones of the selectable ports in each condition of the valve member.

13. The apparatus of claim 8, and further comprising two refrigeration system conduits having first ends thereof respectively connected to the first and second selectable ports and having other ends thereof respectively connectable to ports of an associated refrigeration system.

14. The apparatus of claim 8, wherein the valve member is moveable about an axis, the common port being disposed along the axis and the selectable ports being spaced-apart about the axis.

15. A method of providing communication between a refrigerant processing apparatus and high-pressure and low-pressure ports of an automotive air-conditioning system, comprising:

provided a multi-position valve having a common port and at least two selectable ports and a valve member selectively movable among a closed condition isolating the common port from the selectable ports and three open conditions connecting the common port respectively to each of the selectable ports and both of the selectable ports, connecting the common port to the refrigerant processing apparatus, and connecting the selectable ports respectively to the high-pressure and low-pressure ports of the air-conditioning system.

16. The method of claim 15, including manually moving the valve member among its several conditions.

17. The method of claim 15, wherein the connecting steps include effecting the connections by means of conduits.

18. The method of claim 15, wherein the providing step includes providing a ball valve.

19. The method of claim 18, wherein the providing step includes providing a ball valve wherein the valve member is movable about an axis, the common port being disposed along the axis and the selectable ports being spaced-apart about the axis.

* * * * *